United States Patent
Matsuura et al.

(10) Patent No.: US 6,954,843 B2
(45) Date of Patent: Oct. 11, 2005

(54) DATA DRIVEN INFORMATION PROCESSOR CAPABLE OF INTERNALLY PROCESSING DATA IN A CONSTANT FREQUENCY IRRESPECTIVE OF AN INPUT FREQUENCY OF A DATA PACKET FROM THE OUTSIDE

(75) Inventors: Yasuhiro Matsuura, Nara-ken (JP); Kouichi Hatakeyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 416 days.

(21) Appl. No.: 10/024,294

(22) Filed: Dec. 21, 2001

(65) Prior Publication Data

US 2002/0112143 A1 Aug. 15, 2002

(30) Foreign Application Priority Data

Feb. 15, 2001 (JP) .................................... 2001-038369

(51) Int. Cl.[7] .............................................. G06F 15/82
(52) U.S. Cl. ...................... 712/25; 712/26; 712/201; 713/400; 713/501
(58) Field of Search ......................... 712/25, 26, 201; 713/400, 501

(56) References Cited

U.S. PATENT DOCUMENTS

| | | | | |
|---|---|---|---|---|
| 5,274,833 A | * | 12/1993 | Shima et al. ................. | 712/25 |
| 5,327,125 A | * | 7/1994 | Iwase et al. .................. | 341/61 |
| 5,369,774 A | | 11/1994 | Hatakeyama ................. | 712/25 |
| 5,483,657 A | | 1/1996 | Hatakeyama ................. | 712/27 |
| 5,542,079 A | | 7/1996 | Hatakeyama ................. | 712/26 |
| 5,590,355 A | | 12/1996 | Shichiku et al. ............. | 712/26 |
| 5,794,065 A | | 8/1998 | Hatakeyama et al. ........ | 712/26 |
| 6,373,410 B2 | * | 4/2002 | Ishikura et al. .............. | 341/61 |

FOREIGN PATENT DOCUMENTS

JP          06-004393          1/1994

* cited by examiner

*Primary Examiner*—Kenneth S. Kim
(74) *Attorney, Agent, or Firm*—Birch, Stewart, Kolasch & Birch, LLP

(57) ABSTRACT

A packet generation unit divides a plurality of generated clocks to generate clocks with different frequencies, selects any of the frequencies, sets destination information and data depending on a selected clock rate and generates a data packet that stores the setting result. An input/output control unit taken the data packet generated by the packet generation unit and sends it to a program storage unit or a data memory interface unit according to the destination information. As a result, information can be internally processed in a predetermined frequency without depending on an outside clock. When the outside clock is slow, information can be internally processed in a higher-rate frequency. On the contrary, when the outside clock is too fast to internally process information, information can be internally processed in a lower-rate frequency to secure a processing time.

7 Claims, 6 Drawing Sheets

DATA DRIVEN INFORMATION PROCESSOR CAPABLE OF INTERNALLY PROCESSING DATA IN A CONSTANT FREQUENCY IRRESPECTIVE OF AN INPUT FREQUENCY OF A DATA PACKET FROM THE OUTSIDE

BACKGROUND OF THE INVENTION

The present invention relates to a data driven information processor, which performs image processing, arithmetic processing and so forth.

In a conventional Neumann-type computer, various commands are stored in a program memory as programs in advance. The program counter sequentially specifies addresses in the program memory to read these commands successively, and the read commands are executed.

On the other hand, a data driven information processor is a kind of a non-Neumann-type computer, which does not have a concept of sequential execution of commands by the program counter. Such a data driven information processor adopts an architecture wherein commands are processed in parallel. In this data driven information processor, commands can be executed as soon as all data to be processed are prepared. Then, since a plurality of commands are simultaneously driven by the prepared data, programs are executed in parallel along a spontaneous data flow. Therefore, it is considered that time required for operation is significantly reduced.

FIG. 5 is a block diagram showing an example of a configuration of a conventional data driven information processor. FIG. 6 shows an example of a field configuration in a data packet processed by the data driven information processor shown in FIG. 5.

The data packet shown in FIG. 6 includes a destination field, a command field and a data field. The destination field stores data memory information and node information, the command field stores command information and the data field stores operand data. Here, the data memory information is information used to specify an address in a data memory 6 shown in FIG. 5. The node information is information used to specify an address when a data flow program is read.

In FIG. 5, the data driven information processor includes an input/output control unit 1, program storage unit 2, pair data detection unit 3, arithmetic processing unit 4, data memory interface unit 5 and data memory 6.

The input/output control unit 1 has an input control function for merging data packets inputted from the outside or the like and sending them successively in order and an output control function for outputting data packets inputted from the arithmetic processing unit 4 to destinations according to provided destination information.

The program storage unit 2 stores a data flow program as shown in FIG. 7. The program storage unit 2 reads a pair of destination information 7 and command information 8 from the data flow program by address specification based on node information in the destination field of the data packet inputted from the input/output control unit 1. Then, the informations are stored in the destination field and the command field of the data packet, and the data packet is outputted to the pair data detection unit 3. It is noted that command information 8 includes information for the arithmetic processing unit 4 and information for the data memory interface unit 5.

The pair data detection unit 3 queues data packets inputted from the program storage unit 2. That is, the pair data detection unit 3 detects two data packets having the same destination information. Then, after operand data (contents of the data field) of one data packet is added into the data field of the other data packet, the other data packet is outputted. The arithmetic processing unit 4 executes an operation based on command information in the data packet inputted from the pair data detection unit 3, stores the result in the data field of the data packet and outputs the data packet to the input/output control unit 1.

The data memory interface unit 5 reads/writes data from/to the data memory 6 based on command information in the data packet inputted from the input/output control unit 1. As a result, contents of the data field of the data packet are stored in the data memory 6. It is noted that data memory information in the destination field of the data packet is used to specify an address in the data memory 6 by the data memory interface unit 5 at this time.

However, the conventional data driven information processor has the following problems. That is, when a data packet is inputted in the input/output control unit 1 from the outside, the data driven information processor executes an operation based on command information in this data packet or reads/writes data from/to the data memory 6. Therefore, input of a data packet from the outside is always necessary, and the data packet is processed depending on an outside clock.

In a Neumann-type computer, program commands are sequentially executed by a program counter operated in a fundamental frequency. However, since a data driven information processor does not have a concept of sequential execution of commands by the program counter, a plurality of commands are simultaneously driven by data, and programs are executed in parallel along a spontaneous data flow. Therefore, the operation rate depends on performance of LSI (Large-scale Integrated Circuits) such as processing or the like.

However, some programs need to be internally processed in a constant frequency different from an input frequency of a data packet from the outside. For example, there is a case where original picture data to be processed is already stored in the data memory 6 in image processing, and arithmetic processing can be performed only in a data driven information processor.

However, as described above, since a data packet is processed depending on an outside clock in the conventional data driven information processor even in such a case, a problem arises that the data cannot be processed when an input frequency of a data packet from the outside is too much faster than the processing frequency of the original picture data. On the contrary, when the input frequency of the data packet from the outside is slower than the processing frequency, the operation rate becomes unnecessarily low.

SUMMARY OF THE INVENTION

Accordingly, the object of the present invention is to provide a data driven information processor capable of internally processing data in a constant frequency irrespective of an input frequency of a data packet from the outside.

In order to achieve the above object, there is provided a data driven information processor, which has a data storing means, a program storing means for reading a subsequent pair of destination information and command information from a data flow program including a plurality of pairs of destination information and command information and writing them to a packet, a pair data detecting means for uniting data in two packets having the same destination information into one packet and an arithmetic processing means for performing arithmetic processing according to command information written in the packet and performs information processing based on the packet inputted from the outside and the data flow program, wherein a packet generating means that has an oscillating means and generates a packet at an oscillation rate of the oscillating means is included.

According to the above configuration, the packet generating means generates a packet at a unique oscillation rate in the data driven information processor. Therefore, information can be processed in a unique frequency different from an input frequency of a packet from the outside.

In one embodiment of the present invention, the oscillating means can oscillate in a plurality of frequencies; and the packet generating means includes a frequency setting means for selecting and setting one oscillation frequency from the plurality of oscillation frequencies.

According to this embodiment, one oscillation frequency is set from a plurality of oscillation frequencies by the frequency setting means in the packet generating means, and a packet is generated at an oscillation rate based on the set frequency. Therefore, the packet can be generated at an oscillation rate depending on the content to be processed.

In one embodiment of the present invention, the packet generating means includes a destination setting means for setting the destination information to be written in a generated packet.

According to this embodiment, a packet in which destination information is set in advance is generated. Therefore, later processing in the data driven information processor is simplified.

In one embodiment of the present invention, the destination setting means sets an increment value as the destination information.

According to this embodiment, for example, like a destination when pixels, frames or the like are sequentially selected in image processing, sequentially incremented destination information is set in a generated packet in advance.

In one embodiment of the present invention, the packet generating means includes a data setting means for setting data to be written in a generated packet.

According to this embodiment, a packet in which data is set in advance is generated. Therefore, later processing in the data driven information processor is simplified. Therefore, later processing in the data driven information processor is simplified.

In one embodiment of the present invention, the data setting means sets a fixed value or a value changed in predetermined units as the data.

According to this embodiment, for example, like image data of a constant background or a background changed in a plurality of blocks in image processing, fixed data or data changed in predetermined units (for example, a predetermined number of packets) is set in a generated packet in advance.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
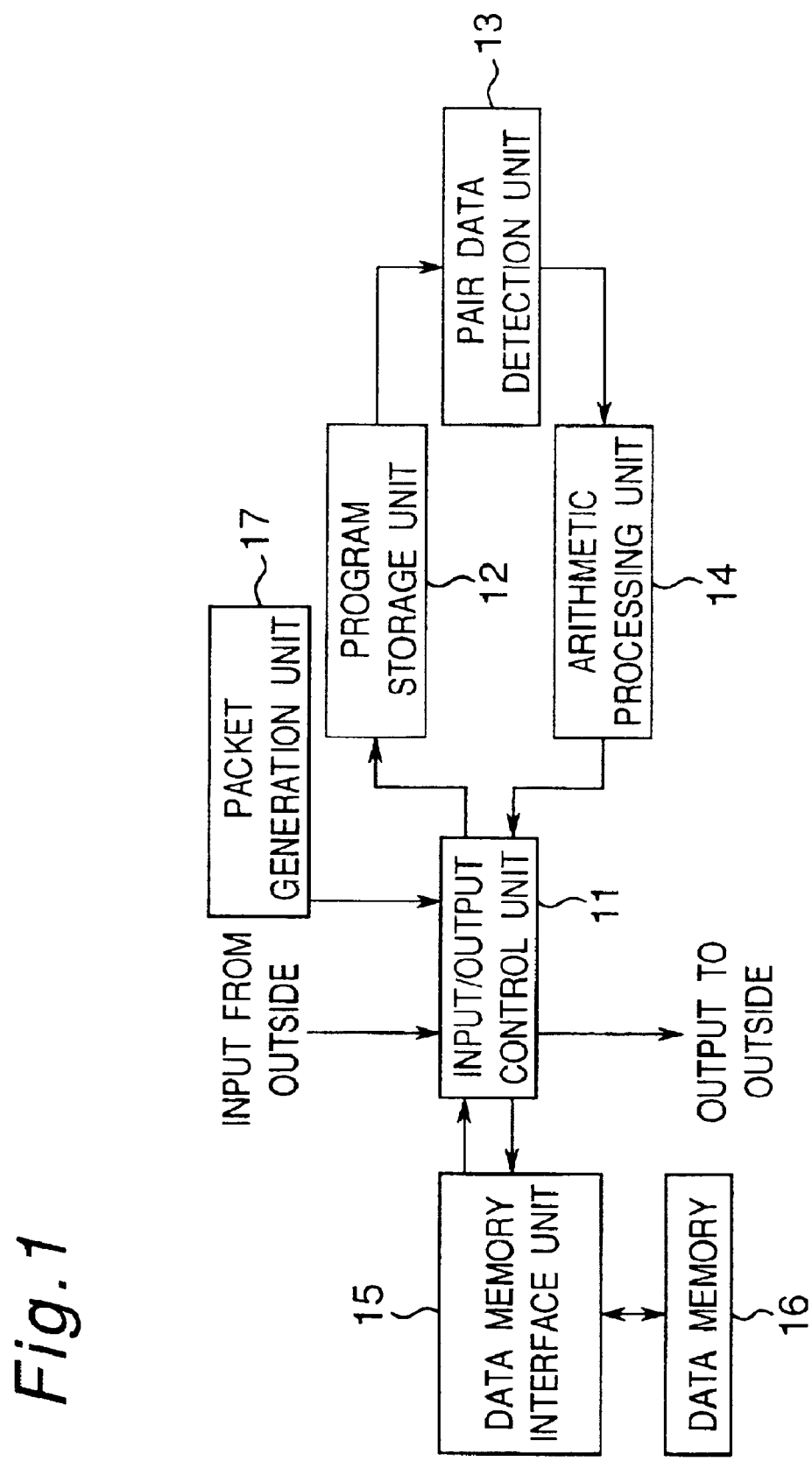
FIG. 1 is a block diagram of a data driven information processor of the present invention.

Hereafter, embodiments of the present invention are explained in detail with reference to the accompanying drawings. FIG. 1 is a block diagram of a data driven information processor according to this embodiment. This data driven information processor is substantially constituted by an input/output control unit 11, program storage unit 12, pair data detection unit 13, arithmetic processing unit 14, data memory interface unit 15, data memory 16 and packet generation unit 17. Here, the program storage unit 12, pair data detection unit 13, arithmetic processing unit 14, data memory interface unit 15 and data memory 16 operate in the same manners as the program storage unit 2, pair data detection unit 3, arithmetic processing unit 4, data memory interface unit 5 and data memory 6 in the conventional data driven information processor in FIG. 5.

Figure 2:
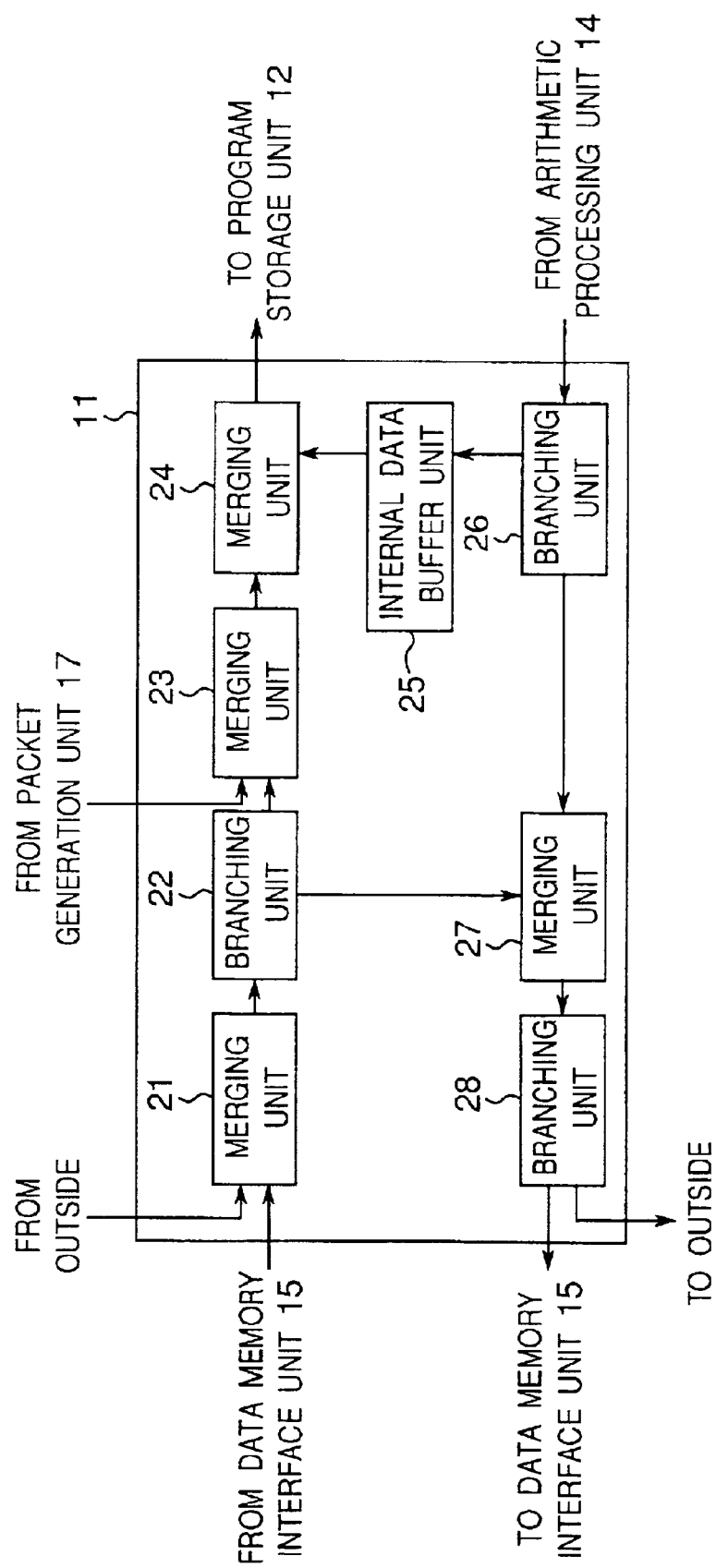
FIG. 2 is a block diagram showing a configuration of an input/output control unit in FIG. 1.
Figure 5:
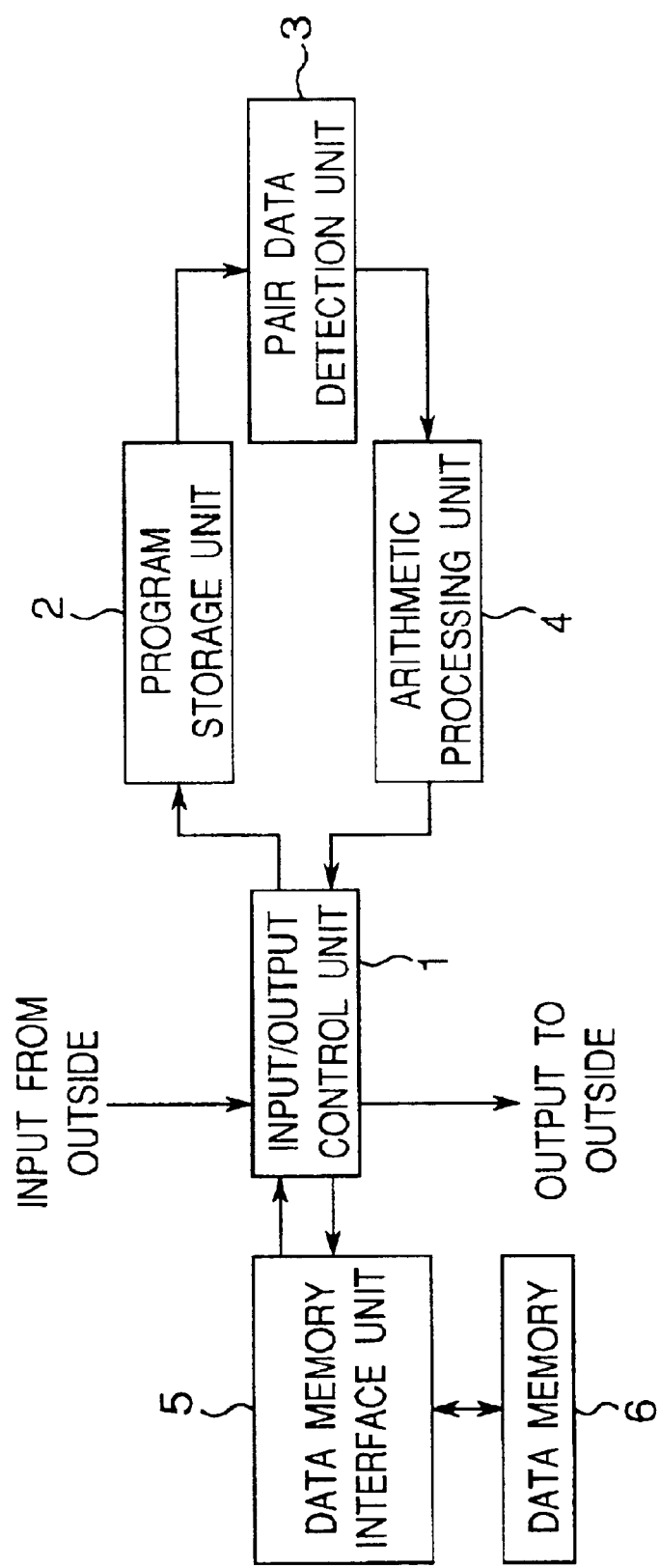
FIG. 5 is a block diagram of a data driven information processor of a background art.

The input/output control unit 11 has a configuration shown in FIG. 2, which is obtained by extending the configuration of the input/output control unit 1 in FIG. 5 so that packet data generated by the packet generation unit 17 can be inputted.

In FIG. 2, a merging unit 21 merges a data packet inputted from the outside and a data packet from the data memory interface unit 15 and sends them to a branching unit 22. The branching unit 22 sends the inputted data packet to a merging unit 23 or merging unit 27 depending on information in a destination field of the data packet. The merging unit 23 merges the data packet from the packet generation unit 17 and the data packet from the branching unit 22 and sends them to a merging unit 24.

The merging unit 24 merges the data packet from the merging unit 23 and a data packet from an internal data buffer unit 25 and sends them to the program storage unit 12. A branching unit 26 sends a data packet from the arithmetic processing unit 14 to the internal data buffer unit 25 or a merging unit 27 depending on information in the destination field of the data packet. The merging unit 27 merges data packets from the branching units 22, 26 and outputs them to a branching unit 28. The branching unit 28 outputs the inputted data packet to the data memory interface unit 15 or the outside depending on information in the destination field of the data packet.

Figure 3:
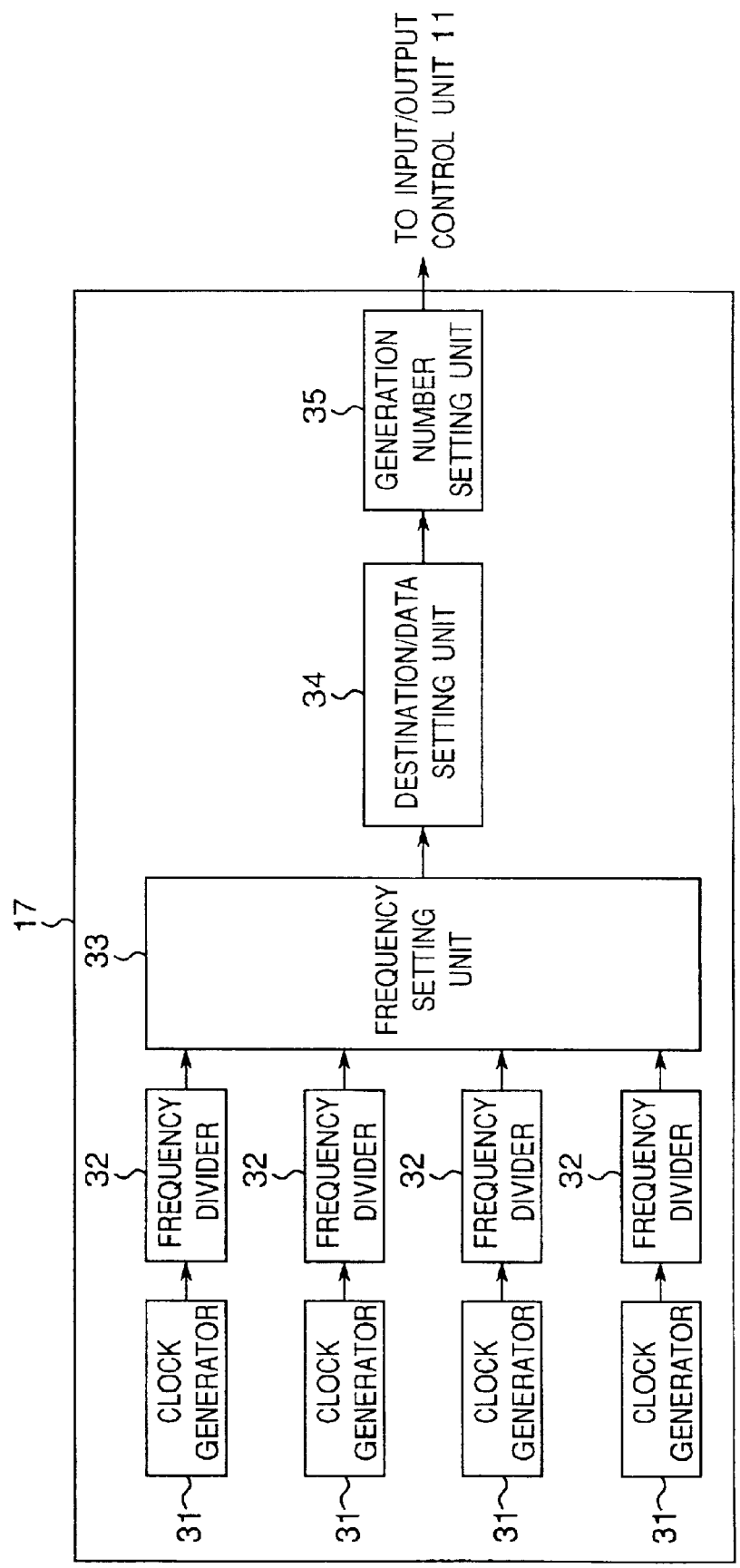
FIG. 3 is a block diagram showing a configuration of a packet generation unit in FIG. 1
Figure 4:
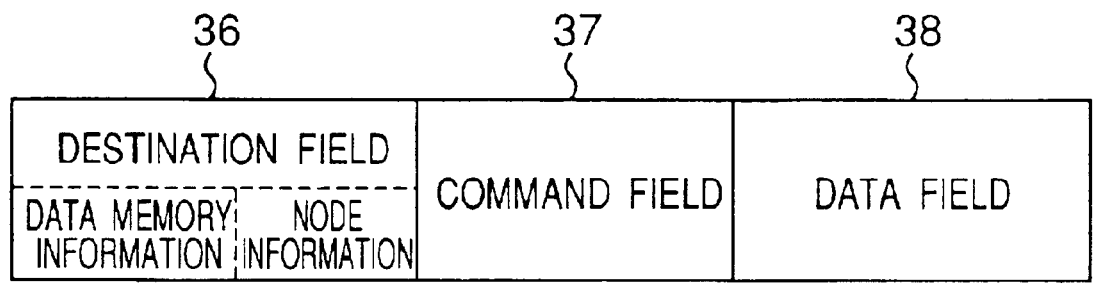
FIG. 4 shows a field configuration of a data packet generated by the packet generation unit.
Figure 6:
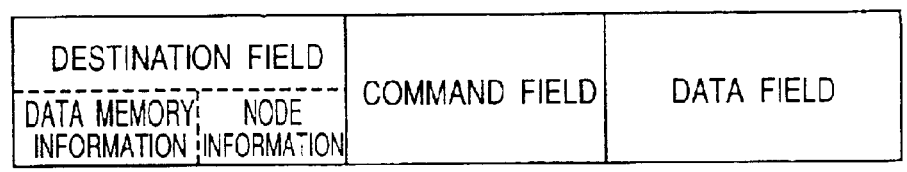
FIG. 6 shows a field configuration of a data packet processed by a data driven information processor.
Figure 7:
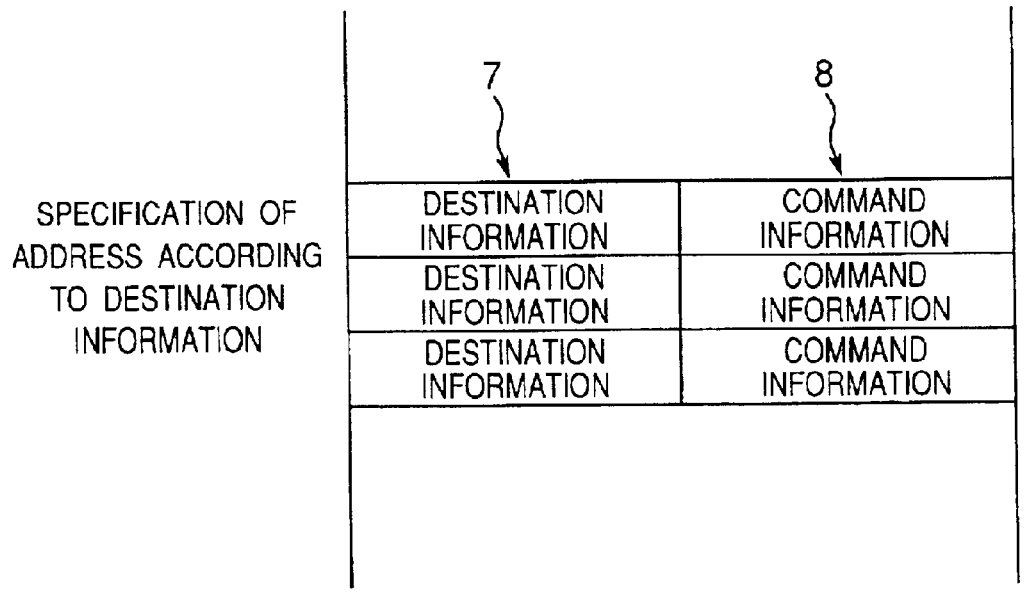
FIG. 7 is a data flow program stored in a program storage unit in FIGS. 1 and 5.

FIG. 3 shows an internal block of the packet generation unit 17. FIG. 4 shows an example of a field configuration in a data packet generated by the packet generation unit 17. It is noted that the field configuration in the data packet generated by the packet generation unit 17 is the same as that of the field configuration in the data packet inputted from the outside (FIG. 6).

In FIG. 3, to optimize the generation rate of a data packet, a plurality of (for example, four in FIG. 3) clock generators 31 and frequency dividers 32 are provided in this packet generation unit 17, and clocks with frequencies different from each other are generated based on clocks from the respective clock generator 31 so that an appropriate clock frequency can be selected therefrom. It is noted that the clock generator 31 is constituted by, for example, a PLL (phase-locked loop) circuit or the like. Each frequency divider 32 divides clocks generated by the corresponding clock generators 31 to generate clocks with frequencies different from each other. That is, in this embodiment, a plurality of clock generators 31 and a plurality of frequency dividers 32 constitute the aforementioned oscillating means.

FIG. 3 shows an example where the plurality of clock generators 31 and frequency dividers 32 are arranged in parallel, but the configuration is not necessarily limited to this configuration. One clock generator and one frequency divider may be used. In this case, the packet generation unit is constituted such that the oscillation frequency can be changed by changing, for example, a voltage of the clock generator (PLL circuit) for setting an oscillation frequency.

A frequency setting unit 33 is a selection circuit constituted by a multiplexer or the like, which selects one of clocks from a plurality of frequency dividers 32 and outputs it. The selecting method by the frequency setting unit 33 at this time is not particularly limited, and the clock can be set by an input from the outside or a parameter set in the program storage unit 12.

The clock generator 31, frequency divider 32 and frequency setting unit 33 can be configured by using a known technique.

A destination/data setting unit 34 sets values of a destination field 36 and a data field 38 of a data packet at a clock rate selected by the frequency setting unit 33. However, the values set here are not formal or complicated ones, but simple values such as fixed values, increment values, decrement values or the like.

For example, it is preferable to set an increment value as a value of the destination field 36. In the case of image processing, in general, pixels, frames or the like in a frame are often sequentially selected to execute arithmetic processing or the like. Therefore, when an increment value is set as a value of the destination field 36 in advance at the time of generation of a data packet, the set increment value can be used as it is in later processing in the data driven information processor, and thus the processing can be simplified.

Further, it is preferable to set a fixed value or a value changed in predetermined units as a value of the data field 38. For example, in the case of image processing, when a screen background or an insert screen background is constant (the whole background is black or the like), a fixed value (constant image data) is set as a value of the data field 38 in advance at the time of generation of a data packet. Or, when the background is a simple pattern changed in a plurality of blocks or the like, the value of the data field 38 is set by combining a fixed value and an increment value. Consequently, the above set value can be used as it is in later processing in the data driven information processor unless it is changed, and thus the processing can be simplified.

It is noted that setting of a value of the command field 37 by the destination/data setting unit 34 is unnecessary since the value is set by the program storage unit 12 later.

The generation number setting unit 35 sets the number of data packets to be generated, generates a data packet for storing a destination field 36 value and a data field 38 value sent from the destination/data setting unit 34 and outputs it to the input/output control unit 11 at a clock rate selected by the frequency setting unit 33. The method for setting the number of data packets to be generated is not particularly limited, but the number can be set by a parameter set by the program storage unit 12. Consequently, only a set number of data packets are generated.

By providing the packet generation unit 17 having such a configuration, for example, when original picture data is stored in the data memory 16, packets in the same number as that of pixels in the original picture are generated by the packet generation unit 17, arithmetic processing is executed for the original picture data stored in the data memory 16 and the execution result is stored in the data memory 16. Then, the data packets for the image processing can be eliminated. Consequently, by making the operation rate of the data packets for the image processing higher than an outside clock rate, the processing rate is not lowered even if the number of data packets is increased depending on the number of pixels. Arithmetic processing of an image can be performed in a frequency set inside the data driven information processor.

As described above, in this embodiment, a packet generation unit 17 is provided in the data driven information processor, which has an input/output control unit 11, program storage unit 12, pair data detection unit 13, arithmetic processing unit 14, data memory interface unit 15 and data memory 16 and performs the following operations (a) to (d) for a data packet inputted from the outside.

(a) Reading/writing operand data from/to the data memory 16 by the data memory interface unit 15;
(b) Reading destination information and command information from a stored data flow program by the program storage unit 12 and writing them to a data packet;
(c) Adding operand data of one of two data packets having the same destination information to the other operand data and outputting the other data packet by the pair data detection unit 13; and
d) Executing command information by the arithmetic processing unit 14 and writing the operation result to a data field.

Then, in the packet generation unit 17, clocks generated by a plurality of incorporated clock generators 31 are divided by the corresponding frequency dividers 32 to generate clocks having frequencies different from each other. Any of the generated clocks with the plurality of frequencies is selected by the frequency setting unit 33. Furthermore, values in the destination field 36 and the data field 38 of the data packet are set by the destination/data setting unit 34 depending on the selected clock rate, and a data packet storing the setting result is generated by the generation number setting unit 35. Then, the data packet generated as described above is taken and processed in the input/output control unit 11.

Therefore, for example, when image processing is performed by using a data packet generated for original picture data stored in the data memory 16 by the packet generation unit 17 (that is, inside the data driven information processor), image processing can be executed in a constant frequency without depending on an outside clock. As a result, by making the operation rate of the data packet for the image processing higher than the outside clock rate, arithmetic processing of an image can be performed without lowering the processing rate even when the number of data packets is increased.

Furthermore, by setting an increment value as a value in the destination field 36, the destination/data setting unit 34 in the packet generation unit 17 can set a value of the destination field 36 in a generated data packet in advance, which is sequentially incremented like, for example, a destination when pixels, frames or the like are sequentially selected in image processing. In this case, later processing in the data driven information processor can be simplified.

Furthermore, by setting a fixed value or a value changed in predetermined units as a value in the data field 38, the destination/data setting unit 34 in the packet generation unit 17 can set a value of the data field 86 in a generated data packet in advance, which is fixed or changed in predetermined units (for example, a predetermined number of packets) of a simple pattern such as a certain background or a background changed in a plurality of blocks in image processing. In this case, later processing in the data driven information processor can be simplified.

Furthermore, a data packet generated by the packet generation unit 17 is eliminated when operation in the arithmetic processing unit 14 or processing such as write to the data memory 16 or the like is finished. Thus, an unnecessary data packet after processing is deleted.

In the above embodiment, data packets generated by the packet generation unit 17 are merged between the branching unit 22 and the merging unit 24 in the input/output control unit 11. However, the merging position of data packets from the packet generation unit 17 is not particularly limited to the above-described position, and data packets may be merged at other positions depending on the processing content. Furthermore, the merging position may be switched depending on the processing content.

Furthermore, the field configuration of the data packet is not limited to those shown in FIGS. 4 and 6. For example, the data field may be divided into a plurality of fields.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data driven information processor, comprising:
   a packet generating means that includes an oscillating means for generating data packets at an oscillation rate of the oscillating means,
   the data packets comprising
      a destination field in which destination information for specifying an address in a data memory or an address in a data flow program are stored,
      a command field in which command information for an arithmetic processing means or for a data memory interface unit is stored, and
      a data field in which operand data is stored;
   an input/output control unit that merges data packets inputted from outside the data driven information processor, the arithmetic processing means, the packet generating means or from the data memory interface unit, branches and outputs these data packets to the data memory interface unit, a program storing means or the outside according to destination information stored in the destination field of the data packet, wherein
   the program storing means stores a data flow program including a plurality of pairs of destination information and command information, reads a subsequent pair of destination information and command information from an address of the data flow program specified by the destination information stored in a data packet inputted from the input/output control unit, and writes them to the data packet;
   a pair data detecting means that detects two data packets having the same destination information among data packets inputted from the program storing means, writes an operand data of one detected data packet to the data field of the other detected data packet, and outputs the other detected data packet, wherein
   the arithmetic processing means performs arithmetic processing on data written in a data packet inputted from the pair data detecting means according to command information of the data packet, stores the processed result in the data field of the data packet, and outputs the data packet to the input/output control unit, and
   the data memory interface unit reads data from and writes data to the data memory based on the destination information and the command information of a data packet inputted from the input/output control unit.

2. The data driven information processor according to claim 1, wherein
   the oscillating means can oscillate in a plurality of frequencies; and
   the packet generating means includes a frequency setting means for selecting and setting one oscillation frequency from the plurality of oscillation frequencies.

3. The data driven information processor according to claim 1, wherein
   the packet generating means includes a destination setting means for setting the destination information to be written in a generated packet.

4. The data driven information processor according to claim 3, wherein
   the destination setting means sets an increment value as the destination information.

5. The data driven information processor according to claim 1, wherein
   the packet generating means includes a data setting means for setting data to be written in a generated packet.

6. The data driven information processor according to claim 5, wherein
   the data selling means sets a fixed value or a value changed in predetermined units as the data.

7. The data driven information processor according to claim 1, wherein
   after precessing according to the written command information is finished, the packet generated by the packet generating means is eliminated.

* * * * *